United States Patent
Chen et al.

(10) Patent No.: US 12,021,788 B2
(45) Date of Patent: Jun. 25, 2024

(54) METHOD AND APPARATUS FOR CONFIGURATION, MEASUREMENT AND REPORTING OF CHANNEL STATE INFORMATION FOR LTE TDD WITH DYNAMIC UL/DL CONFIGURATION

(71) Applicant: Texas Instruments Incorporated, Dallas, TX (US)

(72) Inventors: Runhua Chen, Plano, TX (US); Anthony Edet Ekpenyong, Houston, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/176,086

(22) Filed: Feb. 15, 2021

(65) Prior Publication Data

US 2021/0184821 A1    Jun. 17, 2021

Related U.S. Application Data

(63) Continuation of application No. 15/809,846, filed on Nov. 10, 2017, now Pat. No. 10,924,249, which is a (Continued)

(51) Int. Cl.
*H04L 5/00* (2006.01)
*H04L 1/00* (2006.01)
(Continued)

(52) U.S. Cl.
CPC .............. *H04L 5/0073* (2013.01); *H04L 1/00* (2013.01); *H04L 1/0023* (2013.01);
(Continued)

(58) Field of Classification Search
CPC ....... H04L 5/0073; H04L 1/00; H04L 1/0023; H04L 5/0053; H04L 5/0091; H04L 5/14;
(Continued)

(56) References Cited

U.S. PATENT DOCUMENTS 9,106,386 B2 *   8/2015   Etemad ............. H04W 52/0209
9,119,097 B2 *   8/2015   Chatterjee ............. H04L 5/0053
(Continued)

FOREIGN PATENT DOCUMENTS

CN           102812658 B       12/2015
WO         2012094985 A1        7/2012
(Continued)

OTHER PUBLICATIONS

Alcatel-Lucent Shanghai Bell, et al., "Remaining details on CSI measurement for TDD eIMTA," R1-135150, 3rd Generation Partnership Project (3GPP), Mobile Competence Centre, 650, Route Des Lucioles, F-06921 Sophia-Antipolis Cedex, France, vol. RAN WG1, San Francisco, US, Nov. 11-15, 2013 (3 pages).
(Continued)

*Primary Examiner* — Brian T O Connor
(74) *Attorney, Agent, or Firm* — Gregory J. Albin; Frank D. Cimino

(57) ABSTRACT

A method of operating a time division duplex (TDD) wireless communication system is disclosed. The method includes establishing communications with a remote transceiver. A subframe configuration including static and flexible subframes is determined and transmitted to the remote transceiver. A channel state information (CSI) report is received from the remote transceiver in response to the subframe configuration.

17 Claims, 5 Drawing Sheets

Related U.S. Application Data continuation of application No. 14/530,654, filed on Oct. 31, 2014, now Pat. No. 9,819,471.

(60) Provisional application No. 61/899,550, filed on Nov. 4, 2013.

(51) Int. Cl.

| | | |
|---|---|---|
| *H04L 5/14* | (2006.01) | |
| *H04W 28/02* | (2009.01) | |
| *H04W 72/21* | (2023.01) | |
| *H04W 72/54* | (2023.01) | |
| *H04W 72/542* | (2023.01) | |
| *H04W 76/00* | (2018.01) | |

(52) U.S. Cl.
CPC ............ *H04L 5/0053* (2013.01); *H04W 72/21* (2023.01); *H04W 76/00* (2013.01); *H04L 5/0091* (2013.01); *H04L 5/14* (2013.01); *H04L 5/1469* (2013.01); *H04W 28/0231* (2013.01); *H04W 72/54* (2023.01); *H04W 72/542* (2023.01)

(58) Field of Classification Search
CPC ............ H04L 5/1469; H04W 72/0413; H04W 76/00; H04W 28/0231; H04W 72/08; H04W 72/085; H04W 72/1226; H04W 72/1231

See application file for complete search history.

(56) References Cited

U.S. PATENT DOCUMENTS

| | | | | |
|---|---|---|---|---|
| 9,197,683 | B2* | 11/2015 | Fwu | H04W 72/541 |
| 9,271,279 | B2* | 2/2016 | Khoshnevis | H04L 1/00 |
| 9,456,358 | B2* | 9/2016 | Chen | H04L 5/0094 |
| 9,467,984 | B2* | 10/2016 | Seo | H04L 5/0055 |
| 9,544,115 | B2* | 1/2017 | Barbieri | H04L 5/005 |
| 9,572,063 | B2* | 2/2017 | Etemad | H04L 43/0811 |
| 9,819,471 | B2* | 11/2017 | Chen | H04L 5/0073 |
| 9,888,493 | B2* | 2/2018 | Park | H04L 1/1887 |
| 10,098,020 | B2* | 10/2018 | Davydov | H04W 40/246 |
| 10,412,760 | B2* | 9/2019 | Ekpenyong | H04L 5/0055 |
| 10,485,019 | B2* | 11/2019 | Ekpenyong | H04W 72/23 |
| 10,505,703 | B2* | 12/2019 | Ouchi | H04W 72/0446 |
| 10,560,955 | B2* | 2/2020 | Shoshan | H04B 7/15542 |
| 10,924,249 | B2* | 2/2021 | Chen | H04W 72/21 |
| 2012/0094985 | A1 | 4/2012 | Chen | |
| 2012/0176925 | A1 | 7/2012 | Hwang | |
| 2013/0112004 | A1 | 5/2013 | Gammon | |
| 2013/0142268 | A1* | 6/2013 | Gao | H04W 72/04 375/252 |
| 2013/0194982 | A1 | 8/2013 | Fwu | |
| 2013/0272170 | A1 | 10/2013 | Chatterjee | |
| 2014/0247816 | A1* | 9/2014 | Kim | H04B 7/2656 370/336 |
| 2014/0369294 | A1 | 12/2014 | Seo | |
| 2015/0078271 | A1* | 3/2015 | Kim | H04L 5/005 370/329 |
| 2015/0249517 | A1* | 9/2015 | Seo | H04W 72/042 370/329 |
| 2016/0044663 | A1* | 2/2016 | Yao | H04L 1/1671 370/336 |
| 2016/0080963 | A1* | 3/2016 | Marinier | H04L 5/0053 370/252 |
| 2016/0105882 | A1* | 4/2016 | Park | H04L 5/0048 370/329 |

FOREIGN PATENT DOCUMENTS

| | | |
|---|---|---|
| WO | 2012167431 A1 | 12/2012 |
| WO | 2013112004 A1 | 8/2013 |

OTHER PUBLICATIONS

CATT, "Remaining Details on a Periodic CSI Feedback for Transmission Mode 1-9," 3GPP TSG-RAN WG1 Meeting #76bis, R1-141174, Shenzhen, China, Mar. 31-Apr. 4, 2014, 8 pages.

EP Search Report, Application No. 14857252.2 mailed Jan. 31, 2018 (21 pages).

First Chinese Office Action and Search Report dated Feb. 19, 2019, Chinese Application No. 201480060119.6, 24 pages.

Intel Corporation, "Discussion on CSI Enhancements for eIMTA Support", R1-135099, 3rd Generation Partnership Project (3GPP), Mobile Competence Centre, 650, Route Des Lucioles, F06921 Sophia-Antipolis Cedex, France, vol. RAN WG1, San Francisco, US, Nov. 11-15, 2013 (5 pages).

LG Electronics, "Remaining Details of CSI Measurement and Report for TDD eIMTA," R1-135453, 3rd Generation Partnership Project (3GPP), Mobile Competence Centre, 650, Route Des Lucioles, F-06921 Sophia-A, vol. RAN WG1, San Francisco, US, Nov. 11-15, 2013 (4 pages).

Mediatek, Inc., "Collision Handling for Periodic CSI Reporting in Subframe Subsets," R1-110142, 3rd Generation Partnership Project (3GPP), Mobile Competence Centre, 650, Route Des Lucioles, F-06921 Sophia-Antipolis Cedex, France, vol. RAN WG1, Dublin, Ireland, Jan. 17-21, 2011 (3 pages).

Potevio, "Discussion on CSI feedback for eIMTA," R1-135444, 3rd Generation Partnership Project (3GPP), Mobile Competence Centre, 650, Route Des Lucioles, F-06921 Sophia-Antipolis Cedex, France, vol. RAN WG1, San Francisco, US, Nov. 11-15, 2013 (3 pages).

Prosecution History for U.S. Appl. No. 14/530,654, 202 pages.

Prosecution History for U.S. Appl. No. 15/809,846, 223 pages.

Qualcomm Incorporated, "Discussion on Signaling Details for TDD UL-DL Reconfiguration," 3GPP TSG RAN WG1 Meeting #75, R1-135290, Nov. 11-15, 2013, San Francisco, USA, 4 pages.

Second Chinese Office Action dated Sep. 27, 2019, Chinese Application No. 201480060119.6, 26 pages.

Third Chinese Office Action dated Apr. 2, 2020, Chinese Application No. 201480060119.6, 24 pages.

ZTE, "Csi Feedback Enhancement for TDD eIMTA," 3GPP TSG-RAN WG1 Meeting #75, R1-135367, Nov. 11-15, 2013, San Francisco, USA, 6 pages.

* cited by examiner

| UPLINK-DOWNLINK CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

D DOWNLINK (DL) SUBFRAME  U UPLINK (UL) SUBFRAME  S SPECIAL SUBFRAME

FIG. 2
(PRIOR ART)

METHOD AND APPARATUS FOR CONFIGURATION, MEASUREMENT AND REPORTING OF CHANNEL STATE INFORMATION FOR LTE TDD WITH DYNAMIC UL/DL CONFIGURATION

This application is a continuation of U.S. patent application Ser. No. 15/809,846, filed Nov. 10, 2017, which is a continuation of U.S. patent application Ser. No. 14/530,654, filed Oct. 31, 2014 (now U.S. Pat. No. 9,819,471), which claims the benefit of Provisional Patent Application No. 61/899,550, filed on Nov. 4, 2013, the contents of all of which are incorporated herein by reference in their entirety.

BACKGROUND OF THE INVENTION

This application claims the benefit under 35 U.S.C. § 119(e) of Provisional Appl. No. 61/899,550, filed Nov. 4, 2013 (TI-74515PS), which is incorporated herein by reference in its entirety.

The present embodiments relate to wireless communication systems and, more particularly, to operation of a Time Division Duplex communication system with dynamic reconfiguration of downlink (DL) and uplink (UL) time slots over which a user equipment (UE) communicates with one or more base stations.

With Orthogonal Frequency Division Multiplexing (OFDM), multiple symbols are transmitted on multiple carriers that are spaced apart to provide orthogonality. An OFDM modulator typically takes data symbols into a serial-to-parallel converter, and the output of the serial-to-parallel converter is frequency domain data symbols. The frequency domain tones at either edge of the band may be set to zero and are called guard tones. These guard tones allow the OFDM signal to fit into an appropriate spectral mask. Some of the frequency domain tones are set to values which will be known at the receiver. Among these are cell-specific reference signals (CRS), channel state information reference signals (CSI-RS), and demodulation reference signals (DMRS). These reference signals are useful for channel and interference measurement at the receiver. Cell-specific reference signals as well as channel state information reference signals are not precoded and are generated by a pseudo-random sequence generator as a function of the physical cell ID. In Releases 8 through 10 of the Long Term Evolution (LTE) of the Universal Mobile Telecommunications System (UMTS), which was designed for conventional point-to-point communication, the cell ID is not explicitly signaled by the base station (called eNB) but is implicitly derived by the UE as a function of the primary synchronization signal (PSS) and secondary synchronization signal (SSS). To connect to a wireless network, the UE performs a downlink cell search to synchronize to the best cell. A cell search is performed by detecting the PSS and SSS of each available cell and comparing their respective signal quality, for example, in terms of reference signal received power (RSRP). After the cell search is performed, the UE establishes connection with the best cell by deriving relevant system information for that cell. Similarly, for LTE Release 11 the UE performs an initial cell search to connect to the best cell. To enable multi-point CoMP operation, the connected cell then configures the UE by higher-layer signaling with a virtual cell ID for each CSI-RS resource associated with each respective base station involved in the multi-point CoMP operation. The UE generates the pseudo-random sequence for each CSI-RS resource as a function of the virtual cell ID.

Conventional cellular communication systems operate in a point-to-point single-cell transmission fashion where a user terminal or equipment (UE) is uniquely connected to and served by a single cellular base station (eNB or eNodeB) at a given time. An example of such a system is Release 8 of the 3GPP Long-Term Evolution. Advanced cellular systems are intended to further improve the data rate and performance by adopting multi-point-to-point or coordinated multi-point (CoMP) communication where multiple base stations can cooperatively design the downlink transmission to serve a UE at the same time. An example of such a system is the 3GPP LTE-Advanced system. This greatly improves received signal strength at the UE by transmitting the same signal to each UE from different base stations. This is particularly beneficial for cell edge UEs that observe strong interference from neighboring base stations.

FIG. 1 shows an exemplary wireless telecommunications network 100. The illustrative telecommunications network includes base stations 101, 102, and 103, though in operation, a telecommunications network necessarily includes many more base stations. Each of base stations 101, 102, and 103 (eNB) is operable over corresponding coverage areas 104, 105, and 106. Each base station's coverage area is further divided into cells. In the illustrated network, each base station's coverage area is divided into three cells. A handset or other user equipment (UE) 109 is shown in cell A 108. Cell A 108 is within coverage area 104 of base station 101. Base station 101 transmits to and receives transmissions from UE 109. As UE 109 moves out of Cell A 108 into Cell B 107, UE 109 may be handed over to base station 102. Because UE 109 is synchronized with base station 101, UE 109 can employ non-synchronized random access for a handover to base station 102. UE 109 also employs non-synchronous random access to request allocation of uplink 111 time or frequency or code resources. If UE 109 has data ready for transmission, which may be user data, a measurements report, or a tracking area update, UE 109 can transmit a random access signal on uplink 111. The random access signal notifies base station 101 that UE 109 requires uplink resources to transmit the UE's data. Base station 101 responds by transmitting to UE 109 via downlink 110 a message containing the parameters of the resources allocated for the UE 109 uplink transmission along with possible timing error correction. After receiving the resource allocation and a possible timing advance message transmitted on downlink 110 by base station 101, UE 109 optionally adjusts its transmit timing and transmits the data on uplink 111 employing the allotted resources during the prescribed time interval. Base station 101 configures UE 109 for periodic uplink sounding reference signal (SRS) transmission. Base station 101 estimates uplink channel quality indicator (CQI) from the SRS transmission.

Traditional wireless communication systems operate in either Frequency Division Duplex (FDD) or Time Division Duplex (TDD) modes. In a FDD mode, a pair of radio frequency (RF) carriers is assigned respectively to the downlink and uplink directions of the communication system. In contrast, a TDD system operates by time-multiplexing uplink and downlink transmissions within a fixed time interval on the same RF carrier. The ratio between UL and DL transmissions in the fixed time interval may be selected according to UL/DL data traffic patterns, or to support coexistence between dissimilar TDD wireless systems. The user equipment in a TDD system operates in a half-duplex mode, whereby it either receives from or transmits to the base station at any time instant but may not simultaneously transmit/receive.

FIG. 2, 200 is a diagram of a Long Term Evolution (LTE) TDD system. A radio frame of 10 milliseconds (ms) is partitioned into 1 ms subframes, where each subframe is either downlink (D), uplink (U) or a special subframe (S). There are seven Uplink-Downlink (UL/DL) configurations each with different uplink, downlink and special subframe patterns. For a cell under its control, an eNB selects one of the seven UL/DL configurations and broadcasts the configuration in system information. User equipment served by the eNB decodes the cell's system information to determine the correct uplink/downlink subframe configuration for the cell.

Referring now to FIG. 3, there is a diagram of a downlink subframe in LTE. Each subframe comprises twelve OFDM symbols with Extended Cyclic Prefix (CP) or fourteen OFDM symbols with Normal Cyclic Prefix (CP). The system bandwidth 315 consists of a plurality of L Physical Resource Blocks (PRB), where each PRB is composed of twelve OFDM tones called sub-carriers. The PRB is the smallest time-frequency resource allocation unit in LTE, where data transmission to a user is scheduled on one or multiple PRBs. Different PRBs in one subframe 301 are allocated for data transmission to different users. Furthermore, the set of PRBs on which a user receives downlink data transmission may change from one subframe to another.

Referring now to FIG. 4, there is a diagram of a special subframe in the LTE TDD system. The special subframe 400 consists of a downlink pilot time slot (DwPTS) 401, a guard period 402 and an uplink pilot time slot (UpPTS) 403. The guard period (GP) 402 enables the user equipment to switch from reception mode to transmission mode. The GP duration may also be dimensioned to support coexistence between different TDD systems such as coexistence between LTE TDD and Time-Division Synchronous Code Division Multiple Access (TD-SCDMA). Downlink data transmission may take place in the DwPTS region 401 which supports between three and twelve OFDM symbols. The UpPTS region 403 consists of one or two OFDM symbols and may be used to either transmit on the Physical Random Access Channel or to transmit SRS to the eNB.

In addition to downlink data, a base station also needs to transmit control information to mobile users. This includes both common control information as well as user-specific control information. Common control information is transmitted to all users in the cell to maintain users' connection to the network, page users in idle mode when a call comes in, schedule random access response, and indicate critical system information changes in the cell. In addition, user-specific control information is transmitted to each scheduled user, for example, to indicate the frequency resources on which the UE is expected to receive downlink data or transmit uplink data. Referring back to FIG. 3, each LTE subframe is divided into legacy control region 306 for downlink control information transmission and data region 307 for downlink data transmissions. The legacy control region 306 comprises OFDM symbols 1-3 when the system bandwidth is greater than 10 PRBs and OFDM symbols 2-4 otherwise. The exact size of the legacy control region is signaled on a Physical Downlink Control Format Indicator Channel (PCFICH). The data channel region 307 is located after the legacy control channel region 306 and is allotted for each Physical Resource Block (PRB). The legacy control channel region 306 is a region to which a Physical Downlink Control Channel (PDCCH) is mapped. The data channel region 307 is a region to which a Physical Downlink Shared Channel (PDSCH) is mapped and carries downlink data transmission to mobile users. Further, Enhanced Physical Downlink Control Channels EPDCCH Set 1 309 and EPDCCH Set 2 313 are frequency multiplexed with the data channel (PDSCH) 311 for transmission to a UE. That is, EPDCCH Set 1 309 and EPDCCH Set 2 313 are mapped to the data channel region 307 together with the PDSCH 311. The reason to locate the legacy control channel region at the beginning of the subframe is that a UE firstly receives a PDCCH allotted to the legacy control channel region 306 to recognize the presence of transmission of the PDSCH. Once the presence of transmission of the PDSCH is recognized, the UE may determine whether to perform a receiving operation of the PDSCH. If no PDCCH is transmitted to the UE, it is unnecessary to receive the PDSCH mapped to the data channel region 307. Accordingly, the UE may save power consumed in a receiving operation of the PDSCH. Meanwhile, the UE may receive a PDCCH located in the control channel region faster than the PDSCH 311 to reduce a scheduling delay. However, because the PDCCH is transmitted over the entire system bandwidth, interference control is impossible.

The legacy control channel region 306 may not be changed to a frequency multiplexing structure to maintain compatibility with an existing or legacy UE. However, if the eNodeB does not allot a corresponding region of the data channel region 307 to a UE of a previous LTE version, the UE of a previous LTE version does not receive a resource mapped to a corresponding data channel region 307. Accordingly, the eNodeB may transmit an EPDCCH for a UE of a new LTE version in a data channel region 307 that is not allotted to the UE. In other words, an EPDCCH being a control channel for a UE of a new LTE version has a structure multiplexed with the PDSCH.

FIG. 5 is a diagram of a Physical Resource Block (PRB) pair. The eNB may configure 1, 2, 4, or 8 PRB pairs for transmission to the UE. However, each PRB pair is a replica, and only one PRB pair is shown for the purpose of explanation. Each column of the diagram of the subframe corresponds to 12 subcarriers or tones in an OFDM symbol. There are 14 OFDM symbols in the subframe with a normal cyclic prefix (CP). The 3 OFDM symbols on the left side of the subframe include resource elements (REs) for transmission of a legacy physical downlink control channel (PDCCH) and legacy cell-specific reference signals (CRS). These 3 OFDM symbols are necessary for backwards compatibility with previous wireless standards. The 11 OFDM symbols on the right include resource elements (REs) for transmission of an enhanced physical downlink control channel (EPDCCH), and demodulation reference signals (DMRS), as well as cell-specific reference signals (CRS) and orphan or unused REs. Orphan REs may exist because the UE shall always assume that 24 REs are reserved for DMRS transmission in a PRB pair configured for EPDCCH transmission.

While the preceding approaches provide steady improvements in interference measurement and Channel State Information reporting for wireless communications, the present inventors recognize that still further improvements are possible. Accordingly, the preferred embodiments described below are directed toward this as well as improving upon the prior art.

BRIEF SUMMARY OF THE INVENTION

In a preferred embodiment of the present invention, there is disclosed a method of operating a time division duplex (TDD) wireless communication system. The method includes establishing communications with a remote transceiver. A subframe configuration including static and flexible subframes is determined and transmitted to the remote transceiver. A channel state information (CSI) report is received from the remote transceiver in response to the subframe configuration.

BRIEF DESCRIPTION OF THE SEVERAL VIEWS OF THE DRAWING

FIG. 2 is a table showing LTE TDD uplink/downlink configurations of the prior art;

DETAILED DESCRIPTION OF THE INVENTION

Figure 1:
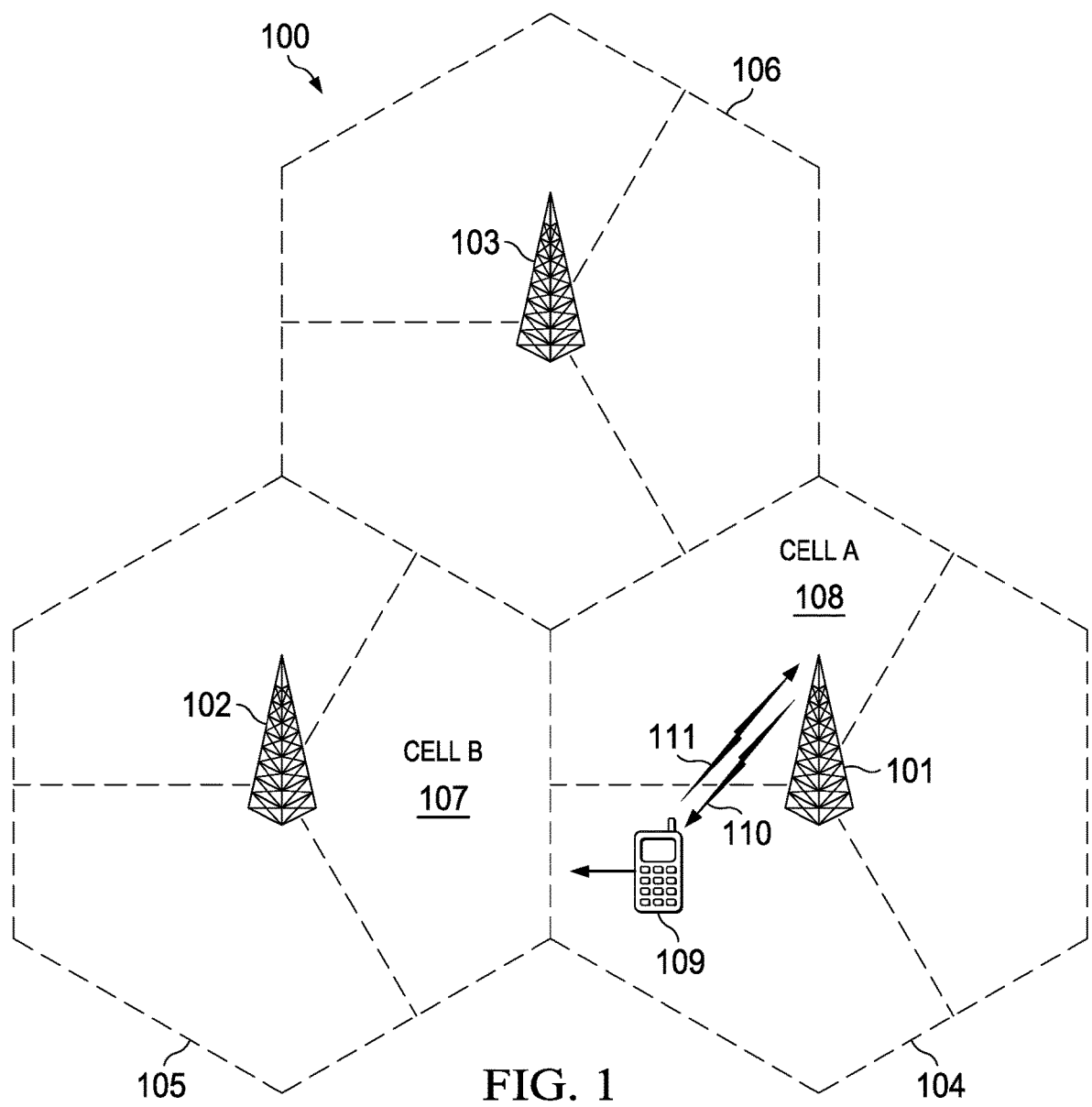
FIG. 1 is a diagram of a wireless communication system of the prior art.

In a traditional homogeneous TDD network with macro cell deployments, the UL and DL traffic patterns may be substantially static or semi-static. Thus, a same TDD UL/DL configuration may be employed at least for time intervals in the range of hundreds of milliseconds (ms) or seconds. However, in a heterogeneous network (het-net) with small cell deployments, the UL and DL traffic patterns may be more dynamic in nature. In addition, the proximity of the neighboring small cells may introduce more dynamism into inter-cell interferences, and thus may affect system performance and/or capacity. Therefore, wireless system performance may be significantly improved by a much faster adaptation of the TDD UL/DL configuration in response to the dynamic traffic and interference patterns seen in a het-net. TDD Enhanced Interference Mitigation and Traffic Adaptation (eIMTA) is an LTE Release 12 feature that introduces a fast adaptation of the TDD UL/DL configuration by dynamically signaling a reconfiguration command on the PDCCH or EPDCCH. The rate of adaptation can be as fast as an LTE radio frame of 10 ms. However, dynamic reconfiguration of the TDD UL/DL configuration may not be applicable to UEs of earlier LTE releases such as LTE Releases 8-11. Therefore, while a first UE may be configured to monitor downlink control channels for a change in the TDD UL/DL configuration, a second UE of an earlier release follows the semi-statically configured TDD UL/DL configuration that is signaled in System Information Block Type 1 (SIB1). Unlike conventional LTE TDD systems where neighboring cells of the same cellular operator use the same TDD UL/DL configuration, neighboring cells utilizing the eIMTA feature may configure different TDD UL/DL configurations in the same radio frame. This difference may result in both UL-to-DL and DL-to-UL inter-cell interference.

Channel state information (CSI) is essential at the eNB for scheduling downlink or uplink data transmission to and from user equipment. Accordingly, embodiments of the present invention describe methods for configuring, measuring and reporting CSI to the eNB for dynamic adaptation of TDD UL/DL configuration of a cell.

Some of the following abbreviations are used throughout the instant specification.

CCE: Control Channel Element
CQI: Channel Quality Indicator
CRS: Cell-specific Reference Signal
CSI: Channel State Information
CSI-IM: Channel State Information Interference Measurement
CSI-RS: Channel State Information Reference Signal
DCI: DownLink Control Information
DL: DownLink
DMRS: Demodulation Reference Signal
eICIC: Enhanced Inter-cell Interference Coordination
eIMTA: Enhanced Interference Mitigation and Traffic Adaptation
eNB: E-UTRAN Node B or base station or evolved Node B
EPDCCH: Enhanced Physical Downlink Control Channel
E-UTRAN: Evolved Universal Terrestrial Radio Access Network
feICIC: Further Enhanced Inter-cell Interference Coordination
HARQ: Hybrid Automatic Repeat Request
ICIC: Inter-cell Interference Coordination
LTE: Long Term Evolution
MIMO: Multiple-Input Multiple-Output
PCFICH: Physical Control Format Indicator Channel
PDCCH: Physical Downlink Control Channel
PDSCH: Physical Downlink Shared Channel
PMI: Precoding Matrix Indicator
PRB: Physical Resource Block
PUCCH: Physical Uplink Control Channel
PUSCH: Physical Uplink Shared Channel
RE: Resource Element
RI: Rank Indicator
RRC: Radio Resource Control
SIB1: System Information Block Type 1
SNR: Signal to Noise Ratio
SRS: Sounding Reference Signal
TDD: Time Division Duplex
UE: User Equipment
UL: UpLink
ZP-CSI-RS: Zero-power Channel State Information Reference Signal Scheduling in a wireless network is achieved by the base station (eNB in LTE) transmitting downlink control information to mobile terminals (UE in LTE). In a cellular wireless network, a base station may need to schedule transmissions to multiple mobile users at the same time. As a result, the base station needs to transmit downlink control information to different users simultaneously. It is also possible that the base station may transmit different types of control information to a UE simultaneously, such as common control information and UE-specific control information.

In LTE, downlink control information bits are carried in a Downlink Control Information (DCI) format. A DCI is channel encoded, modulated, and transmitted in a specific physical transmission channel over an air interface. In a legacy system, DCI formats are transmitted by the Physical Downlink Control Channel (PDCCH). A PDCCH is transmitted in the legacy PDCCH region. Different DCI formats are used for different scheduling purposes. DCI can be used to transmit common control information to all users in a cell, UE-specific downlink control information to schedule PDSCH data transmission to a UE, or UE-specific downlink control information to schedule uplink data transmission from the UE to the eNB.

Table I below is a relation between DCI formats and corresponding downlink transmission modes. The DCI formats are UE-specific, monitored by UEs, and scrambled by C-RNTI.

| DL Mode | DCI format | Transmission scheme |
|---|---|---|
| Mode 1 | DCI 1A | Single antenna port with cell-specific reference signal (CRS) port 0 |
| Mode 2 | DCI 1 | Transmit diversity |
| Mode 3 | DCI 2A | Open-loop spatial multiplexing |
| Mode 4 | DCI 2 | Closed-loop spatial multiplexing |
| Mode 5 | DCI 1D | Single-layer multiuser MIMO with CRS |
| Mode 6 | DCI 1B | Single-layer closed-loop precoding with CRS |
| Mode 7 | DCI 1 | Single-layer beamforming with demodulation reference symbol (DMRS) port 5 |
| Mode 8 | DCI 2B | Dual-layer spatial multiplexing with DMRS ports 7-8 |
| Mode 9 | DCI 2C | 8-layer spatial multiplexing with DMRS ports 7-14 |
| Mode 10 | DCI 2D | Coordinated Multi-Point communication, 8-layer spatial multiplexing with DMRS ports 7-14 |

In LTE Release 11, a new physical channel called Enhanced Physical Downlink Control Channel (EPDCCH) is defined to transmit downlink control information in a cell. Referring back to FIG. 3, as an additional physical resource for control information, the EPDCCH is transmitted in a subset of physical resource blocks (PRB) in the data region 307 and outside of the legacy PDCCH control region 306. The eNB may configure plural EPDCCH sets in the downlink. Each EPDCCH set comprises a subset of PRBs which are semi-statically configured by radio resource control (RRC) higher layer signals. For each UE, the configured EPDCCH set(s) may be orthogonal or partially overlapping. EPDCCH sets are configured in a UE-specific manner and could be identical or different for different users.

Figure 3:
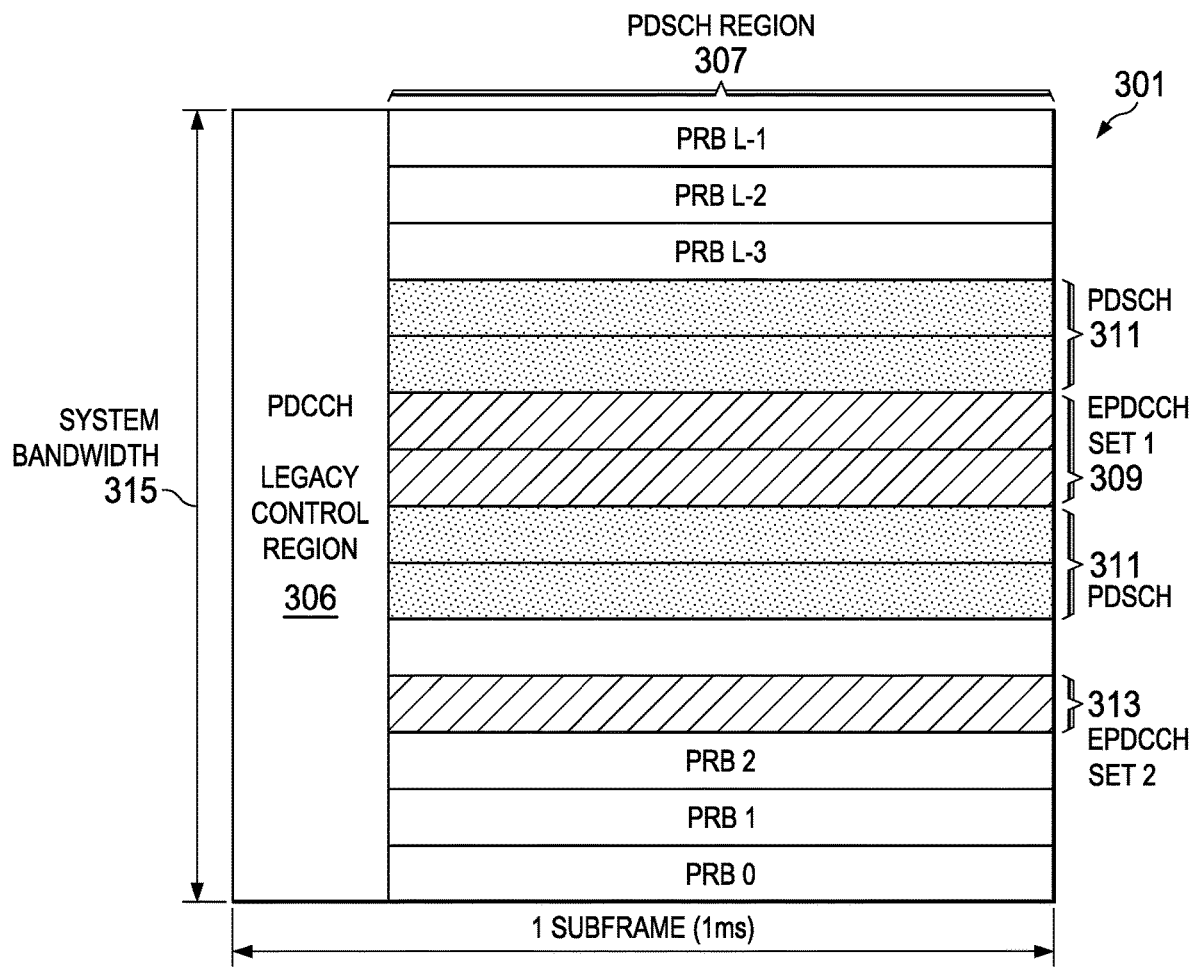
FIG. 3 is a diagram of an LTE downlink subframe of the prior art.
Figure 4:
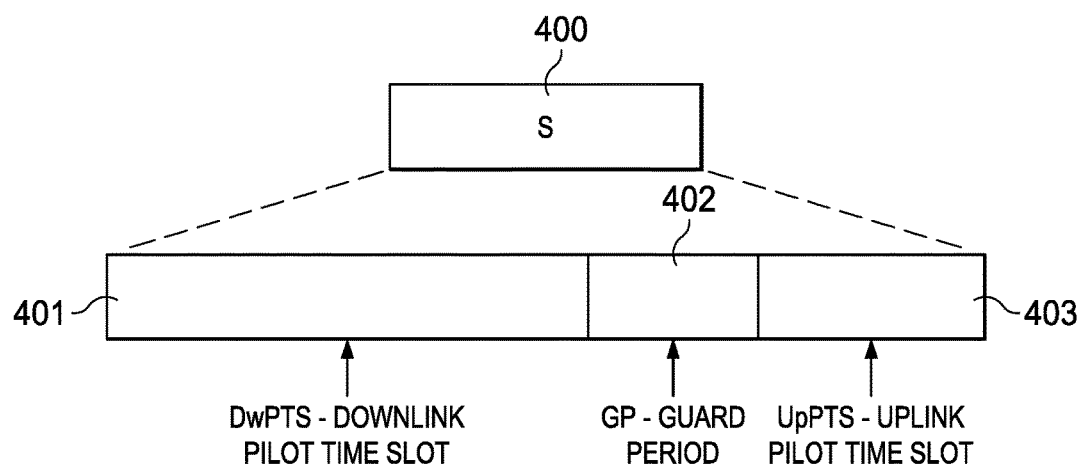
FIG. 4 is a diagram of an LTE special subframe of the prior art.
Figure 5:
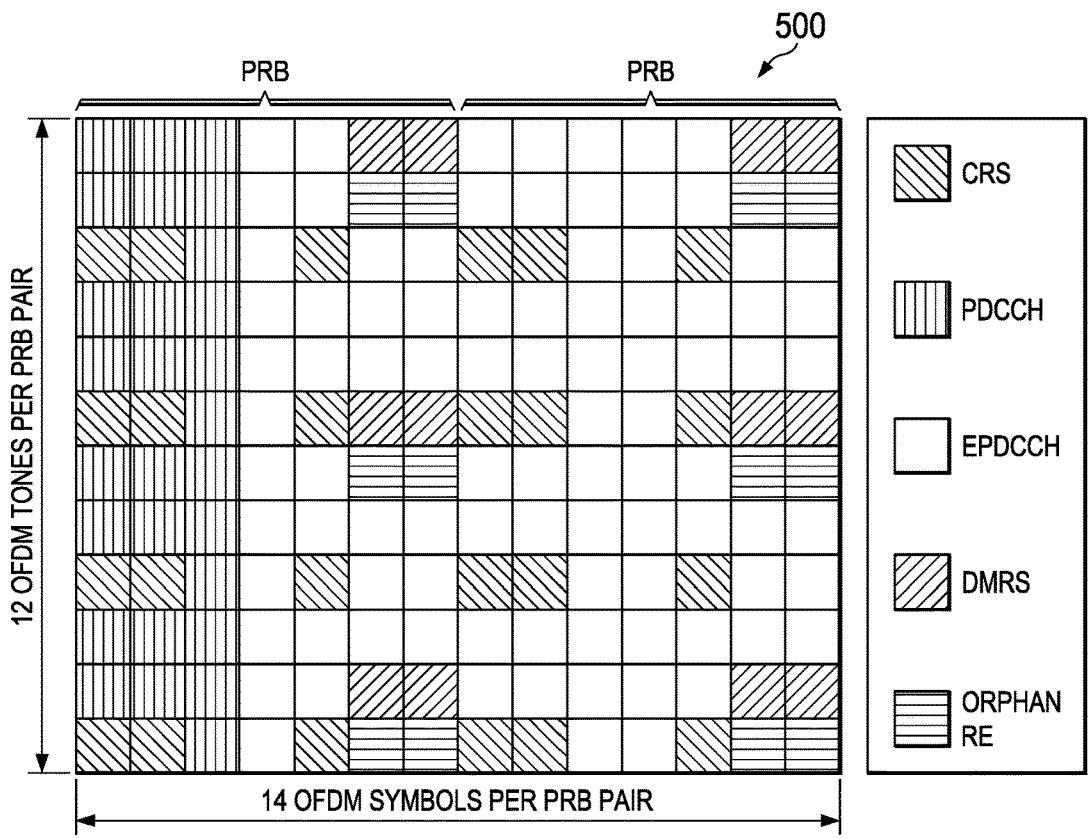
FIG. 5 is a diagram of a Physical Resource Block (PRB) pair of the prior art.

Turning now to FIG. 5, there is a diagram of a Physical Resource Block (PRB) pair according to a first embodiment of the present invention. The eNB may configure 1, 2, 4, or 8 PRB pairs for transmission to the UE. However, each PRB pair is a replica, and only one PRB pair is shown for the purpose of explanation. Each column of the diagram of the subframe corresponds to 12 subcarriers or tones in an OFDM symbol. There are 14 OFDM symbols in the subframe with a normal cyclic prefix (CP). The 3 OFDM symbols on the left side of the subframe include resource elements (REs) for transmission of a legacy physical downlink control channel (PDCCH) and legacy cell-specific reference signals (CRS). These 3 OFDM symbols are necessary for backwards compatibility with previous wireless standards. The 11 OFDM symbols on the right include resource elements (REs) for transmission of an enhanced physical downlink control channel (EPDCCH), and demodulation reference signals (DMRS), as well as cell-specific reference signals (CRS) and orphan or unused REs. Orphan REs may exist because the UE shall always assume that 24 REs are reserved for DMRS transmission in a PRB pair configured for EPDCCH transmission. The subframe is also divided into enhanced resource element groups (eREG). The eREGs are used to form enhanced control channel elements (eCCEs) without regard to whether they belong to a localized or distributed EPDCCH candidate. In the example of FIG. 3, a single row or tone of a PRB may form one eREG so that there are 12 eREGs in each subframe per PRB configured for EPDCCH transmission.

To facilitate optimal scheduling of downlink data, a UE may be configured to measure and report channel state information to the eNB. The eNB configures the UE with a time-frequency CSI reference resource. The frequency part of the CSI reference resource consists of a set of PRBs for which the CSI report is valid, whereas the time component refers to a subframe for which a hypothetical transmission of a data transport block can be received by the UE with a block error rate percentage of at most 10%. Periodic and/or aperiodic CSI reporting may be configured for a UE, where the periodic report is transmitted on the PUCCH and the aperiodic report is transmitted on the PUSCH.

The CSI measurement is a function of the SNR that is observed by a UE. In LTE transmission modes 1-8, a UE measures the channel and interference components of the CSI report from the transmitted Cell-specific Reference Signal (CRS). In LTE transmission modes 9 and 10, a UE may be configured to measure the channel part based on Channel State Information Reference Signals (CSI-RS). In addition, a UE operating in transmission mode 10 may be configured to measure an interference part based on an interference measurement resource that is contained in a zero-power CSI-RS configuration.

Figure 6:
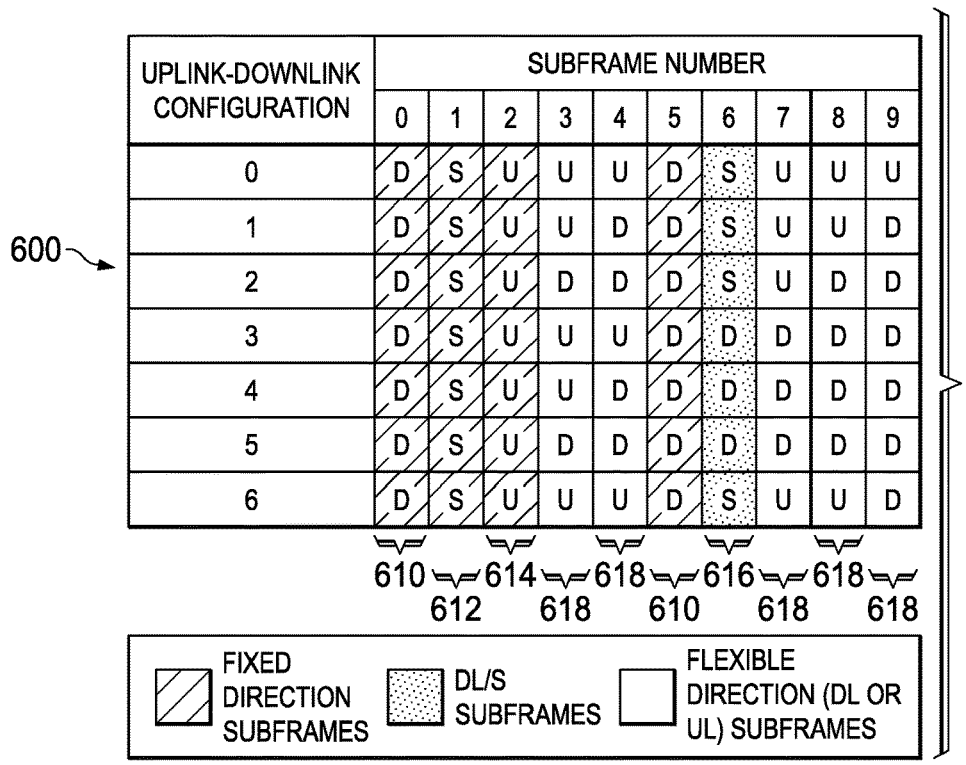
FIG. 6 is a block diagram showing operation of a user equipment and a base station according to the present invention.

According to the present invention, a mix of legacy LTE (Releases 8-11) and eIMTA-capable UEs may be served by an eNB in the same cell. The legacy UEs determine UL/DL/Special subframe pattern according to the UL/DL subframe configuration signaled in SIB1, whereas a UE capable of eIMTA may be configured to monitor for a PDCCH or EPDCCH conveying a DCI packet containing a dynamic reconfiguration of the UL/DL subframe configuration. A valid UL/DL configuration received in a detected DCI in a PDCCH or EPDCCH must be one of the 7 LTE UL/DL configurations (FIG. 2). The UE determines the UL/DL/Special subframe pattern for all radio frames within a reconfiguration time period based on the UL/DL configuration received in the detected DCI. Under TDD enhanced Interference Mitigation (eIMTA), the DL subframe may be static (always DL) or flexible. Certain subframes have a common direction of either UL or DL across all possible UL/DL configurations. The table of FIG. 6 shows that subframes 610 has a static DL direction, subframes 614 have a fixed UL direction and subframes 612 are fixed Special subframes. Subframes 616 are relatively static in the context of scheduling DL data transmission since they are either DL or Special subframes. On the other hand, subframes 618 are flexible subframes since they are either DL or UL depending on the signaled UL/DL configuration.

Figure 7:
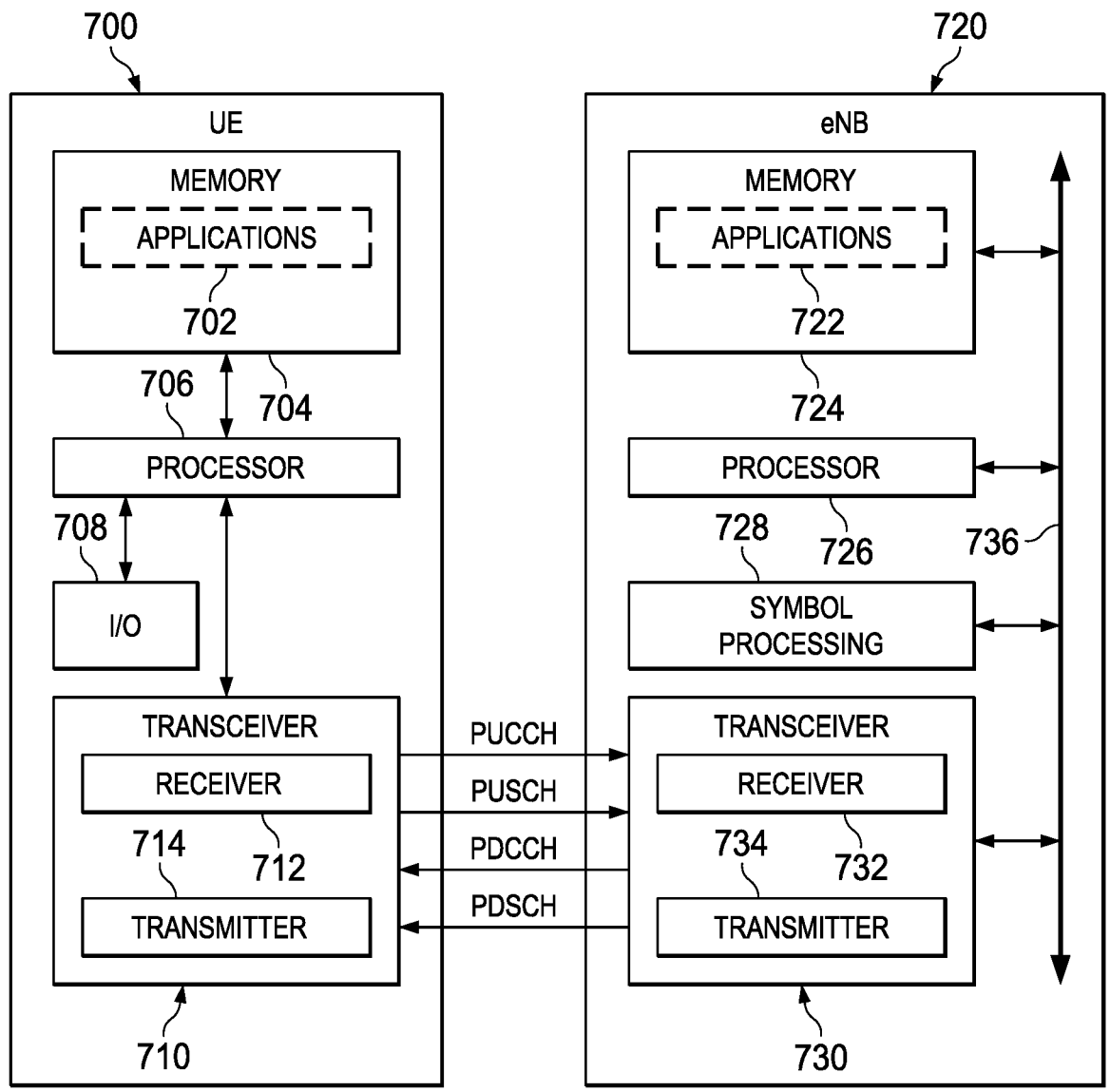
FIG. 7 is a diagram showing LTE TDD fixed and flexible subframe configurations according to the present invention.

Turning now to FIG. 7, there is a diagram showing communication between user equipment (UE) 700 and a base station (eNB) 720 according to the present invention. UE 700 may be a cell phone, computer, or other wireless network device. UE 700 includes a processor 706 coupled to a memory 704 and a transceiver 710. Processor 706 may include several processors adapted to various operational tasks of the UE including signal processing and channel measurement and computation. The memory stores application software that the processor may execute as directed by the user as well as operating instructions for the UE. Processor 706 is also coupled to input/output (I/O) circuitry 708, which may include a microphone, speaker, display, and related software. Transceiver 710 includes receiver 712 and transmitter 714, suitable for wireless communication with eNB 720. Transceiver 710 typically communicates with eNB 720 over various communication channels. For example, transceiver 710 sends uplink information to eNB 720 over physical uplink control channel PUCCH and physical uplink shared channel PUSCH. Correspondingly, transceiver 710 receives downlink information from eNB 720 over physical downlink control channel PDCCH and physical downlink shared channel PDSCH.

Base station 720 includes a processor 726 coupled to a memory 724, a symbol processing circuit 728, and a transceiver 730 via bus 736. Processor 726 and symbol processing circuit 728 may include several processors adapted to various operational tasks including signal processing and channel measurement and computation. The memory stores application software that the processor may execute for specific users as well as operating instructions for eNB 720. Transceiver 730 includes receiver 732 and transmitter 734, suitable for wireless communication with UE 700. Transceiver 730 typically communicates with UE 700 over various communication channels. For example, transceiver 730 sends downlink information to UE 700 over physical downlink control channel PDCCH and physical downlink shared channel PDSCH. Correspondingly, transceiver 730 receives uplink information from UE 700 over physical uplink control channel PUCCH and physical uplink shared channel PUSCH.

Once communication is established with eNB 720, transceiver 710 receives an uplink (UL) grant in a downlink (DL) subframe. Transceiver 710 uses the CRS or CSI-RS in one or more of the DL subframes to create a CSI measurement report that is transmitted to eNB 720 in a subsequent UL subframe. The static and flexible DL subframes experience different interference conditions. In flexible subframes, the inter-cell interference consists of DL-to-UL and UL-to-DL interference depending on the current UL/DL configurations of neighboring cells. Therefore, it is highly advantageous to provide separate CSI interference reports to eNB 720 corresponding to each respective subframe type in order to maximize the DL or UL throughput. For CSI configuration and reporting by a UE configured for eIMTA operation, the set of DL subframes may be sub-divided into two CSI measurement subframe sets denoted as CSI set 0 and CSI set 1. In one embodiment of the present invention, CSI set 0 may consist of static subframes 610 as shown in FIG. 6, whereas CSI set 1 may consist of flexible subframes 618 in FIG. 6. Other configurations of CSI subframe sets are not precluded as the eNB may configure any subset of subframes in a radio frame into CSI sets 0 or 1.

The present invention is directed to providing improved CSI interference reports to eNB 720 for both static and flexible DL subframes. CSI measurement for eIMTA operation is performed in a DL subframe as determined by either the UL/DL configuration signaled in SIB1 system information or the UL/DL configuration dynamically signaled in a PDCCH or EPDCCH. Consequently, if a DL subframe in one radio frame is dynamically signaled to be an UL subframe in a subsequent radio frame, the UE may not perform a CSI measurement in the subframe of the subsequent radio frame. In contrast, a legacy UE measures CSI based on CRS and/or CSI-RS only in DL subframes of the UL/DL configuration signaled by SIB1. Therefore, to support backward compatibility, the DL subframes of the SIB1-signaled UL/DL configuration may not be dynamically changed to UL subframes. Thus, the set of static DL subframes include both DL subframes common to all valid LTE TDD UL/DL configurations as well as DL subframes according to the SIB1-signaled UL/DL configuration. An advantage of this restriction is that the timing of a HARQ-ACK feedback to a UE configured for eIMTA operation in response to a previous UL transmission on the PUSCH may follow the UL HARQ timing determined by the SIB1-signaled UL/DL configuration similar to previous LTE releases. Furthermore, an UL grant scheduling a transmission on the PUSCH may only be transmitted in a static DL subframe (e.g. CSI subframe set 0). It may be impossible, therefore, to trigger a CSI report for a flexible DL subframe that is consistent with legacy CSI timing. There are several possible solutions to this problem. First, UE 700 may provide CSI reports for both static and flexible DL subframes whenever two CSI measurement sets are configured. This may be undesirable as it mandates a maximum feedback overhead all the time and greatly increases complexity for UE 700. Second, the DL subframe location may be used to determine the CSI measurement set to be reported. For example, each DL subframe in which a UL grant is transmitted is associated with one of the two CSI subframe measurement sets. Alternatively, each UL subframe in which aperiodic CSI is reported is associated with one of the two CSI subframe measurement sets. The second solution may also be undesirable, since it imposes additional scheduler restrictions. Third, additional information may be included in a CSI request field of each UL grant to indicate which CSI subframe measurement set is to be reported. This may also be restrictive, since eNB 720 can then only trigger one CSI report with one UL grant at a time.

According to a first embodiment of the present invention higher layer signaling from the Radio Resource Control (RRC) layer configures the CSI subframe measurement set to be reported for each state of the existing CSI request field contained in a UL grant. The CSI request field in an UL grant transmitted to a UE may consist of 1 bit when the UE is configured for single cell operation or two bits when the UE is either configured for carrier aggregation or for CoMP operation. In an exemplary embodiment, the eNB may configure a UE by RRC signaling to receive an UL grant with a 2-bit CSI field wherein '00' indicates no CSI transmission, '01' indicates an aperiodic CSI request for CSI subframe set 0, '10' indicates an aperiodic CSI request for CSI subframe set 1, and '11' indicates an aperiodic CSI request for both CSI subframe sets 0 and 1. Other mapping arrangements of CSI reports to the CSI field in the UL grant are not precluded as the important point here is that flexible CSI reporting configurations may be enabled by RRC signaling. This embodiment advantageously avoids additional UE complexity, scheduler restrictions, and CSI reporting restrictions. A consequence of this embodiment is that the CSI reference resource is no longer tied to the subframe carrying a UL grant indicating an aperiodic CSI request. In legacy LTE systems, a DL subframe carrying a UL grant containing an aperiodic CSI request is typically the CSI reference resource and provides for at least a 4 ms interval, including the UE processing time, before the associated UL transmission. According to this embodiment, if one CSI report is triggered for one subframe set, the corresponding CSI reference resource in the time domain is the most recent valid DL subframe that is prior to and no later than the subframe carrying the UL grant and in the subframe set for which the aperiodic CSI report is triggered. If two CSI reports are triggered for two subframe sets by an aperiodic CSI request in the same UL grant, the associated CSI reference resource for each aperiodic CSI report in the time domain is the most recent valid DL subframe that is prior to and no later than the subframe carrying the UL grant and in the subframe set for which the aperiodic CSI report is triggered. In other words, the CSI reference resources of two aperiodic CSI reports transmitted in one UL subframe may correspond to two different DL subframes and indeed, two different subframe types (static and flexible). For example, one DL subframe may belong to the set of DL subframes determined by the SIB1 signaled TDD UL/DL configuration, whereas the other DL subframe may belong to the set of DL subframes of the dynamically signaled TDD UL/DL configuration in a PDCCH or EPDCCH.

In legacy LTE systems, a CSI process is associated with one CSI-RS resource for channel measurement and one Channel State Information Interference Measurement (CSI-IM) resource for interference measurement. According to a second embodiment of the present invention, a CSI process for eIMTA is associated with one CSI-RS resource and two CSI-IM resources. In one example of this embodiment each CSI-IM resource may be configured to measure the interference observed in static (CSI subframe set 0) and flexible DL subframes (CSI subframe set 1) respectively. The reporting periodicity and subframe offset of each CSI-IM resource is preferably configured by RRC signaling to match the time domain pattern of each subframe set. Thus, CSI-IM 0 is used for interference measurement of CSI subframe set 0, and CSI-IM 1 is used for interference measurement of CSI subframe set 1. For a transmission mode where a UE may be configured with multiple CSI processes, another embodiment of the present invention is to support interference measurements for both static and flexible subframes per CSI process. In this case, the CSI processing time budget at the UE needs to be increased accordingly. The CSI reference resource may additionally satisfy a threshold that guarantees sufficient CSI processing time given by $n_{CQI,ref} \geq n_{threshold}$, where $n_{threshold} \geq 4$ ms. This processing threshold may be a function of the SIB1-signaled or dynamically signaled TDD UL/DL configuration and/or the number of configured CSI processes.

In legacy LTE systems, one CSI process is associated with one non-zero-power CSI-RS resource for channel measurement and one CSI-IM resource for the corresponding interference measurement. Furthermore, the frequency domain component of the CSI-IM resource consists of resource elements that are a subset of the resource elements specified by a zero-power CSI-RS configuration. In one embodiment of the present invention, the UE equipment performs an interference measurement using the resource elements of the CSI-IM resource that are contained within the subframe set. To support two CSI subframe sets in eIMTA operation, different alternatives may be considered. In one alternative, the configured CSI-IM resource within the subframe set belonging to the CSI reference resource is used to derive the interference measurement. In a different embodiment of the present invention a CSI-RS process consists of one CSI-RS resource and two CSI-IM resources associated respectively with CSI subframe sets 0 and 1. The periodicity and subframe offset of each of these CSI-IM resources can be separately configured by RRC signaling to match the pattern of each CSI subframe set. As such, CSI measurement for CSI subframe set 0 uses CSI-IM 0, and CSI measurement for subframe set 1 uses CSI-IM 1. In case one CSI-IM is not fully contained in the corresponding subframe set (e.g. CSI-IM 0 occurs in some subframes of CSI subframe set 1), CSI measurement for subframe set 0 (or 1) may use CSI-IM 0 (or CSI IM 1) only in CSI subframe set 0 (or set 1).

For periodic CSI feedback on the PUCCH, it should be recognized that the PUCCH is a narrow-band channel with a small payload. In legacy LTE systems, only one CSI report may be transmitted on the PUCCH in a subframe. It is still desirable to support periodic CSI reporting of two CSI subframe sets when a UE is configured for eIMTA operation.

The CSI reporting periodicity and subframe offset for each CSI subframe set is independently configured by RRC signaling. For transmission modes 1-9, the CSI reference resource associated with a PUCCH transmission in subframe n is the subframe $n - n_{CQI,ref}$ such that $n_{CQI,ref}$ is the smallest value greater than $n_{threshold} = 4$ and satisfying the conditions that it is a valid DL subframe and in the CSI subframe set corresponding to the requested periodic CSI report. For transmission mode 10, the CSI reference resource associated with a PUCCH transmission in subframe n is the subframe $n - n_{CQI,ref}$ such that $n_{CQI,ref}$ is the smallest value greater than or equal to $n_{threshold} = 4$ and satisfying the conditions that it is a valid DL subframe and in the CSI subframe set corresponding to the requested periodic CSI report. In addition, the exact value of the threshold $n_{threshold}$ is a function of the number of CSI processes configured for the UE.

Due to the independent configuration of periodic CSI reporting in eIMTA operation, a collision may occur in a same UL subframe, where a UE is configured to report CSI measurements for both CSI subframe sets on the PUCCH. As only one report may be transmitted in a subframe, a collision handling mechanism is desirable. An embodiment of the present invention configures via RRC signaling different priorities for different subframe sets. When CSI reports of different subframe sets collide in the same UL subframe, a CSI of subframe set of a higher priority is reported, while a CSI subframe set of a lower priority is not transmitted. In legacy LTE TDD systems, the priority rule may be based on the CSI type (rank versus CQI/PMI information), serving cell index or CSI process index when a UE is respectively configured for carrier aggregation or with multiple CSI processes.

Several priority rules are described in the present invention. In a first alternative, the CSI reports are prioritized according to a semi-statically configured prioritization of the CSI subframe sets. For example if CSI subframe set 0 contains only static DL subframes this may be given a higher priority compared to CSI subframe set 1 containing flexible subframes. Subsequently, the tie-breaking rule for a collision may be secondly, according to CSI type, thirdly, serving cell index and finally, CSI process index.

Other arrangements of this prioritization/tie-breaking rule are not precluded amongst the four categories, namely CSI subframe set, CSI type, serving cell index and CSI process index. For example, to prioritize spatial multiplexing transmission it may be advantageous to assign the highest priority according to the CSI type. Therefore, the following prioritization rules may be configured, where in each rule the categories are according to decreasing level of priority, 1. CSI subframe set priority-CSI type-serving cell index-CSI process index
2. CSI type-CSI subframe set priority-serving cell index-CSI process index
3. CSI type-serving cell index-CSI subframe set priority-CSI process index
4. CSI type-CSI process index-serving cell index-CSI subframe set priority.

Still further, while numerous examples have thus been provided, one skilled in the art should recognize that various modifications, substitutions, or alterations may be made to the described embodiments while still falling with the inventive scope as defined by the following claims. Other combinations will be readily apparent to one of ordinary skill in the art having access to the instant specification.

What is claimed is:

1. A method for time division duplex (TDD) communication, comprising:
   determining, by the base station, a subframe configuration including static and flexible subframes;
   transmitting, by the base station, the subframe configuration to a user equipment (UE) using a downlink control information (DCI) format;
   transmitting, by the base station, an uplink grant to the UE in a downlink frame indicated by the subframe configuration; and
   receiving, at the base station, a channel state information (CSI) report from the UE in subframe n in response to transmitting the uplink grant, wherein n is an integer, wherein the CSI report is determined based on a CSI process that includes a channel state information reference signal (CSI-RS) resource and at least two channel state information interference measurement (CSI-IM) resources,
   wherein the CSI report is determined based on a CSI reference resource in subframe $n-n_{CQI,ref}$, where $n_{CQI,ref}$ is an integer greater than or equal to $n_{threshold}$, and wherein $n_{threshold}$ is a function of the number of CSI processes configured for the UE.

2. The method of claim 1, further comprising:
   signaling the static subframe by Radio Resource Control (RRC); and
   signaling the flexible subframe by a downlink control information (DCI) packet.

3. The method of claim 1, further comprising transmitting a plurality of bits in the uplink grant to indicate which subframe is used for the CSI report.

4. The method of claim 1, further comprising transmitting a plurality of bits in the uplink grant to indicate whether the CSI report is determined from the static subframe, the flexible subframe, or both subframes.

5. The method of claim 1, further comprising transmitting a CSI request in the uplink grant to the UE in a valid downlink subframe at least $n_{threshold}$ subframes prior to an uplink subframe specified by the uplink grant.

6. The method of claim 1, wherein a first CSI-IM resource determines static subframe interference, and wherein a second CSI-IM resource determines flexible subframe interference.

7. The method of claim 1, further comprising receiving periodic CSI reports from the remote transceiver.

8. The method of claim 1, further comprising receiving the CSI report as selected by the UE in order of decreasing priority according to CSI subframe set priority, CSI type, a serving cell index, and a CSI process index.

9. The method of claim 1, further comprising receiving the CSI report as selected by the UE in order of decreasing priority according to CSI type, CSI process index, a serving cell index, and a CSI subframe set priority.

10. The method of claim 1, wherein determining the subframe configuration includes determining the subframe configuration in response to Radio Resource Control (RRC) signaling.

11. A method for a time division duplex (TDD) communication, comprising:
    receiving, at a user equipment (UE), a subframe configuration including static and flexible subframes;
    generating, by the UE, a channel state information (CSI) report in response to receiving the uplink grant, wherein the CSI report is determined based on a CSI process that includes a channel state information reference signal (CSI-RS) resource and at least two channel state information interference measurement (CSI-IM) resources; and
    transmitting, by the UE, the CSI report in subframe n, wherein n is an integer,
    wherein the CSI report is determined based on a CSI reference resource in subframe $n-n_{CQI,ref}$, where $n_{CQI,ref}$ is an integer greater than or equal to $n_{threshold}$, and wherein $n_{threshold}$ is a function of the number of CSI processes configured for the UE.

12. The method of claim 11, wherein the static subframe is signaled by Radio Resource Control (RRC), and wherein the flexible subframe is signaled by a downlink control information (DCI) packet.

13. The method of claim 11, further comprising receiving a plurality of bits in the uplink grant to indicate which subframe is used for the CSI report.

14. The method of claim 11, further comprising receiving a plurality of bits in the uplink grant to indicate whether the CSI report is determined from the static subframe, the flexible subframe, or both subframes.

15. The method of claim 11, wherein an uplink grant from the remote transceiver includes a channel state information reference signal (CSI-RS) resource and at least two channel state information interference measurement (CSI-IM) resources.

16. The method of claim 11, wherein a first CSI-IM signal determines static subframe interference, and wherein a second CSI-IM signal determines flexible subframe interference.

17. The method of claim 11, further comprising:
    generating a channel state information (CSI) report for one of the static and flexible subframes; and
    selecting the CSI report according to at least one of a CSI subframe set priority, a CSI type, a serving cell index, and a CSI process index.

* * * * *